United States Patent Office 3,513,095
Patented May 19, 1970

3,513,095
LUBRICATING OIL COMPOSITION OF IMPROVED DISPERSANCY, VISCOSITY INDEX AND SHEAR STABILITY
Richard F. Love, Beacon, and William M. Sweeney, Wappingers Falls, N.Y., assignors to Texaco Inc., New York, N.Y., a corporation of Delaware
No Drawing. Filed Feb. 20, 1967, Ser. No. 617,090
Int. Cl. C10m 1/32
U.S. Cl. 252—51.5     4 Claims

ABSTRACT OF THE DISCLOSURE

A lubricating oil composition containing between about 0.1 and 80 wt. percent of a novel adduct that imparts thereto improved shear stability, dispersancy and improved viscosity index. The novel additive is the reaction product of (1) a cracked ethyelne-propylene-unconjugated $C_5$–$C_{50}$ diene hydrocarbon terpolymer having an average molecular weight between about 2,000 and 30,000 and an inherent viscosity between 0.2 and 1.8, (2) maleic anhydride and (3) an alkylene polyamine of the formula $H_2N(ANH)_bH$ where A is a divalent saturated aliphatic hydrocarbon radical (alkanediyl) of from 1 to 4 carbons and $b$ is a whole integer of from 1 to 6.

BACKGROUND OF INVENTION

Field of invention

The field of art to which this invention pertains is fluent compositions designed for use between two relatively moving surfaces in contact therewith for reducing friction therebetween containing an additive which also contains oxygen in addition to carbon, hydrogen and nitrogen.

Description of the prior art

The prior art as represented by U.S. 3,235,503 teaches lube oil compositions containing as a detergent-dispersant additive a reaction product of (1) a copolymer having a molecular weight between 10,000 and 1,000,000, preferably between 50,000 and 1,000,000, the copolymer prepared by polymerizing α-olefin and polyolefin monomers preferably derived from cracking $C_1$ to $C_{35}$ wax paraffins, (2) maleic anhydride and (3) an alkylene polyamine including polyamine in which the amine groups are part of the ring structure such as exemplified by amino alkyl piperazine.

Although the prior art products provide satisfactory dispersancy, we have discovered viscosity index, shear stability as well as dispersancy may be substantially improved by employing an adduct in which the hydrocarbon terpolymer moiety therein is directly derived from the cracking of a specific high molecular weight polymer of between about 40,000 and 2,000,000 M.W. rather than an essentially identical adduct wherein the terpolymer moiety therein is directly derived from the polymerization of low molecular weight α-olefin and polyolefin monomers.

SUMMARY OF INVENTION

This invention relates to a lubricant composition containing a novel lubricating oil additive of improved dispersancy and increased viscosity index and shear stability characteristics. More particularly, we have discovered the adduct of (1) a cracked terpolymer consisting of between about 10 and 90 mol percent ethylene, between about 90 and 10 mole percent propylene, between about 0.1 and 10.0 mole percent unconjugated diene, said diene, of from 5 to 50 carbons selected from the group consisting of alkadiene and cycloalkadiene, said terpolymer of a molecular weight between about 2,000 and 30,000 and an inherent viscosity between about 0.2 and 1.8, (2) maleic anhydride and (3) an alkylene polyamine of the formula $H_2N(ANH)_bH$ where A is a divalent saturated aliphatic hydrocarbon radical and $b$ is a whole integer, results in a product which imparts to lubricant compositions in amounts between about 0.1 and 80 wt. percent improved dispersancy, improved (i.e. increased) viscosity index as well as superior shear stability.

In brief background viscosity index is a numerical rating which indicates the effect of a change of temperature on the viscosity of oil. The higher the viscosity index, the less the change.

In regard to detergency, in the use of lubricating oil in engine operations the oil is subjected to considerable contamination from combustion products which result in the formation of sludge and other deposits in the crankcase and on many of the moving parts of the engine. It is, therefore, desirable to have a lubricating oil containing some oil surface active agent which will act as a dispersant for the oil and prevent sludge formation and promote engine cleanliness.

In regard to shear stability, a lubricating oil in engine operation is normally subjected to a shear stress including the additive therein. An additive which is not shear stable or, in other words, shear resistant will break down under shear stresses and the resulting product will be of a different characteristic than the original additive, often resulting in substantially poorer (lower) viscosity index and dispersant characteristics.

It is an object of this invention to provide a lubricating oil composition containing an adduct which imparts to said composition improved viscosity index, dispersancy and shear stability.

DETAILED DESCRIPTION OF THE INVENTION

The lubricating oil compositions of the invention are prepared by first contacting a cracked terpolymer consisting of between about 10 and 90 mole percent ethylene, between about 90 and 10 mole percent propylene and between about 0.1 and 10 mole percent unconjugated diene selected from the group consisting of alkadiene and and cycloalkadiene of from 5 to 50 carbons, said cracked terpolymer having a molecular weight between 2,000 and 30,000 and an inherent viscosity between about 0.2 and 1.8, with maleic anhydride, preferably in the presence of mineral lubricating oil constituting between about 25 and 300 weight percent of the first reaction mixture, at a temperature between about 80 and 250° C. in a mole ratio of said terpolymr to said maleic anhydride between about 1:10 and 1:35 and subsequently contacting the resultant reaction mixture with an alkylene polyamine of the formula $H_2N(ANH)_bH$, where A is a divalent saturated aliphatic hydrocarbon radical of from 1 to 4 carbons and $b$ is a whole integer from 1 to 6, at a temperature between about 25 and 150° C. in a mole ratio of said maleic anhydride to said alkylene polyamine of between about 2:1 and 1:2 thereby forming an adduct wherein n-alkylene polyamine succinimide groups are randomly attached to a cracked hydrocarbon terpolymer backbone, the terpolymer moiety and succinimide moieties being present in an amount of between about 500 and 20,000 molecular weight of terpolymer per succinimide group. The product may be further exemplified by the following formula:

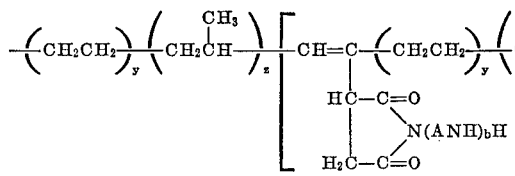 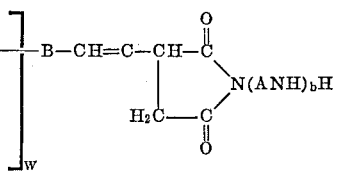

where $y$, $z$ and $w$ are integers of sufficient value to formulate a product as defined and B is a divalent radical of the heretofore defined terpolymer. The preceding formula is to be considered only exemplary since the terpolymer backbone is in actuality composed of a random mixture of ethylene, propylene and diene groups having succinimide groups attached thereto in a random manner.

In regard to the terpolymer reactant the inherent viscosity by which terpolymer reactant is defined equals the natural log of the specific viscosity of the substance in question divided by the concentration in grams per 100 mls. The specific viscosity for this equation is the expression of a ratio of the viscosity at 100° F. (see appendix D, page 103, report No. 4, "Polymer Chemistry," by Robert Magovern, Stamford Research Institute, April 1965).

The terpolymer reactants of the invention are required to be derived from cracking a corresponding higher molecular weight terpolymer precursor, said precursor of a molecular weight between about 40,000 and 2,000,000 and an inherent viscosity between about 1.8 and 5.0 having the same component composition as heretofore described in respect to the cracked terpolymer reactant derivative to the desired lower molecular weight cracked terpolymer reactants of a molecular weight between about 2,000 and 30,000.

The cracking can be accomplished by any conventional cracking process although thermal cracking is preferred. Thermal cracking is accomplished by heating the terpolymer precursor to a temperature in the range of 250 to 450° C. and holding the terpolymer at selective temperature until the terpolymer has been cracked to the desired molecular weight and inherent viscosity. Generally, cracking is effected under such conditions in a period of time ranging from 10 seconds to 10 hours although longer and shorter periods may be employed. It is preferable to effect thermal cracking at a temperature from about 300 to 400° C. in a time period from 2 to 60 minutes. Thermal cracking can be conducted in any vessel or reaction zone which can maintain the terpolymer precursor in the noted temperature range. Alternatively, the terpolymer precursor can be dissolved in a carrier such as mineral lubricating oil and the mixture treated as above to crack the terpolymer precursor. The terpolymer also may be thermally cracked in a heated extruder at same or lower temperature.

Another method of cracking the terpolymer precursor is accomplished by standard catalytic means. In catalytic cracking the terpolymer precursor is contacted with a cracking catalyst at an elevated temperature generally in the range of 150 to 400° C. until the desired inherent viscosity and molecular weight is produced. Catalysts which are effective for cracking the terpolymer precursor include the Friedel-Crafts catalyst, fuller's earth, silica-alumina, chromia-alumina, molybdena, bauxite, silica-magnesia and catalysts generally effective for cracking petroleum streams.

It is to be noted that the cracked terpolymer reactant is in essence a mixture of hydrocarbons of various chain lengths composed in various combinations of ethylene, propylene and diene components. The values given for the amounts of each component and molecular weights are, therefore, average values for the entire mixture. It is to be further noted the cracking does not materially disturb the relative ratio of components in the terpolymer as between terpolymer precursor and terpolymer reactant derivative.

Examples of the unconjugated diene components in the terpolymer precursor and reactant contemplated herein are the non-conjugated alkadienes and cycloalkadienes of from 5 to 50 carbons, preferably from 5 to 20 carbons. Specific dienes which can be employed include bicyclo (2,2,1)-hepta-2,5-diene, 1,4-cyclohexadiene, 1,5-cyclooctadiene, dicyclopentadiene, diisopropenylbenzene, dipentene, 2,2-dimethyl-1,5-hexadiene, 1,5-heptadiene, 1,5-hexadiene, 2-methyl-1,4-cyclohexadiene, methylcyclopentadiene dimer, 3-methyl-1,5-heptadiene, 2-methyl-1,5-hexadiene, 3-methyl-1,5-hexadiene, 1,7-octadiene, 1,4-pentadiene, 4-vinyl-1-cyclohexene and 2-methyl-1,4-pentadiene.

Examples of the alkylene polyamine reactants contemplated herein include ethylenediamine, diethylenetriamine, dipropylene-triamine, tetraethylenepentamine, pentaethylenehexamine, nonoethylenedecamine and dihexamethylenetriamine.

The mineral component in the lubricating composition of the invention and as a preferred medium in the preparation of the cracked terpolymer-succinimide adduct can be any of the mineral lubricating oils suitable for lubricant purposes such as the paraffinic, naphthenic and aromatic base petroleum lubricating oils. Lubricating oils having an SUS viscosity at 100° F. between about 100 and 343 are particularly suitable.

The amount of mineral lubricating oil component in the lubricating oil compositions of the invention range anywhere from between about 20 to 99.9 wt. percent of the reaction mixture. Normally, finished lubricating oil compositions have a cracked terpolymer-succinimide adduct content of between about 0.1 and 10 wt. percent whereas in the lubricating oil composition concentrates resulting directly from the manufacture of the adduct the adduct is normally present in an amount of between about 10 to 80 wt. percent. The concentrates are diluted with additional oil together wtih the addition of other additives such as pour depressants, anti-oxidants and etc. to form the finished lube oil composition. In any case, whether the adduct is in finished or concentrate compositions in the range described, it is present in an amount sufficient to impart increased viscosity index, increased dispersancy and shear stability to the lubricating base oil.

The following examples further illustrate the invention but are not to be considered limitations thereof.

Example I

This example illustrates the preparation of the cracked terpolymer reactant.

Three terpolymeric precursor compositions are subjected to a subsequently described thermal cracking process. They are as follows:

(a) Composition A consists of a 1:1 weight ratio of mineral oil having an SUS viscosity at 100° F. of about 100 and a light gray solid terpolymer precursor of an average molecular weight of about 60,000, composed of about 60 mole percent ethylene, about 39 mole percent propylene and about 1 mole percent 1,5-hexadiene, having an inherent viscosity of 2.16 (1 wt. percent in toluene at 100° F.), a specific gravity of 0.85 and a Mooney viscosity (ML 1+4; 250° F.) of 70. It is readily soluble in benzene and hexane and of a lower solubility in mineral lubricating oil.

(b) Composition B consists of a 1:1 weight ratio of mineral lubricating oil of an SUS viscosity at 100° F. of 2400 and a terpolymer precursor consisting of about 60 mole percent ethylene, 39 mole percent propylene and 1 mole percent dicyclopentadiene having an average molecular weight of about 60,000, a specific gravity (Mooney ML–4 at 212° F.) of 60 and an inherent viscosity at 2.53 (1 wt. percent in toluene at 100° F.).

The foregoing precursor lube oil compositions are thermally cracked to a molecular weight between about 2,000 and 30,000 by heating with slow stirring under nitrogen in a container for a period of 8 to 14 minutes at 350–355° C. and thereafter rapidly cooling to 210° C. and below. The particular test data and results are reported below in Table I:

TABLE I

| Terpolymer Precursor | A | B |
|---|---|---|
| Cracking Conditions: | | |
| Temp., °C | 355 | 350 |
| Time, min | 8 | 14 |
| Cracked Terpolymer Product: Inherent viscosity * | 0.77 | 0.63 |

* Inherent viscosity normally is defined as 1 gram polymer/100 mls. toluene. However, in Runs A and B the inherent viscosity is based respectively on 0.5 and 0.36 grams/100 mls. toluene.

The ratio of ethylene, propylene and diene components in the resulting cracked terpolymer product is the same as in its terpolymer precursor.

Example II

This example illustrates the preparation of the complex additive lube oil composition of the invention.

The cracked terpolymers of the type prepared in Example I having an inherent viscosity between 0.2 and 1.8 are contacted with maleic anhydride at an elevated temperature for a period of time. Any unreacted anhydride is stripped off from the reaction mixture at reduced pressure, i.e., between 0.1 and 50 mm. Hg. A portion of the cooled residue is titrated to determine acidity, that is, the saponification number, which is employed to calculate the molecular weight per succinimide group in the final terpolymer-succinimide reaction product. The residue is diluted with benzene and the desired quantity of tetraethylenepentamine is added. The resultant reaction mixture is then refluxed at an elevated temperature for a period of time. At the end of the reflux period the benzene is evaporated from the resultant mixture leaving a jelly-like residue consisting of a 50:50 wt. percent mixture of lubricating oil and terpolymer-succinimide adduct.

Analysis of the adducts determined them to be composed of a cracked terpolymer backbone of the same composition and molecular weight as the initial cracked terpolymer reactant having randomly distributed therealong N-tetraethylenepentamine succinimide groups.

The particular test data and results are reported below in Table II:

Example III

This example illustrates the dispersancy, VI (viscosity index) improving and shear stability properties of the lubricating oil compositions of the invention.

Test lubricating oil compositions containing the cracked terpolymer-succinimide products of Runs 1, 2 and 3 of Example II are subjected to three tests, namely, a light duty deposit engine test, a bench scale sludge test and a shear stability test. A brief description of these tests is as follows:

*Light duty deposit engine test.*—The procedure comprises lubricating with the test oil composition a single cylinder engine operated at an r.p.m. of 1500 with alternating cooling jacket temperatures of 6 hours at 100° F. and 2 hours at 190° F. The rocker arm area, push rod area, timing gear area, oil pan crankcase and oil screen are periodically inspected for sludge and rated from 10 to 0, a rating of 10 representing a clean no sludge rating and a rating of 0 representing heavy sludge deposits. The rating scales are based on the Coordinating Research Council scales adopted January 1955.

*Bench sludge test.*—The test procedure comprises introducing into 20 cc. bottles portions of the test composition, titanium oxide (6 wt. percent) in oil, aqueous and hydrocarbon engine blowby. The bottles are agitated at an elevated temperature for a period of time and a portion thereof is then centrifuged and visual observations are made of the sediment depth and of the clear oil extending from the top of the sample downward in the tube. For the second and subsequent cycles to the samples remaining in the bottles from the first cycles, portions of the following materials are added in the order listed: titanium oxide (6 wt. percent) in oil, aqueous and hydrocarbon engine blowby and the procedure of the first cycle is repeated. The cycles are continued until the centrifuged oil is clear and completely free of sediment. The greater the number of cycles required to reach the clear oil state the better the dispersancy.

*Shear stability test.*—The viscosity of the test oil compositions is initially taken at 100 and 210° F. A given quantity of test oil composition is then pumped through the restricted passage of a fuel injector. The passage subjects the test sample to a shearing action. The process is repeated on the same sample until twenty passes are made through the fuel injector. The viscosity of the thus treated sample is then remeasured at 100 and 210° F. The greater the difference in viscosities at a given temperature before and after testing the less the shear stability of the test samples.

The base oil employed in the test composition is paraffinic mineral lubricating oil of a specific gravity at 60/60°

TABLE II

| Run | 1 | 2 | 3 | 4 | 5 | 6 |
|---|---|---|---|---|---|---|
| Cracked Terpolymer Product: | | | | | | |
| Av. molecular wt., approx. thousands | 13 | 14 | 10 | 13 | 15 | 20 |
| Ethylene, mole percent | 60 | 60 | 60 | 60 | 60 | 60 |
| Propylene, mole percent | 39 | 39 | 39 | 39 | 39 | 39 |
| 1,5-hexadiene, mole percent | 1 | 1 | | 1 | 1 | 1 |
| Dicyclopentadiene, mole percent | | | 1 | | | |
| Quantities: | | | | | | |
| Cracked terpolymerlube oil comp., g | 80 | 300 | 200 | 200 | 200 | 160 |
| Maleic anhydride, g | 2.0 | 6.0 | 8.0 | 6.0 | 4.0 | 2.0 |
| Tetraethylenepentamine, g | 1.5 | 1.0 | 1.6 | 0.7 | 0.91 | 1.51 |
| Benzene, g | 300 | 400 | 400 | 400 | 400 | 400 |
| Conditions: | | | | | | |
| Cracking time at 350° C., min | 18 | 20 | 45 | 18 | 25 | 8 |
| Maleic contact: | | | | | | |
| Temp., ° C | 210 | 200 | 200 | 200 | 200 | 200 |
| Time, hrs | 4 | 5 | 6 | 5 | 5 | 2 |
| Amine contact: | | | | | | |
| Temp., ° C | 80 | 80 | 80 | 80 | 80 | 25 |
| Time, hrs | 1 | 1 | 1 | 1 | 1 | 0.5 |
| Terpolymer-succinimide adduct: M.W. of terpolymer/succinimide group | 5,500 | 3,800 | 1,280 | 6,800 | 4,200 | 10,000 | of 0.86 and API gravity of 32 and an SUS viscosity at 100° F. of about 128.

The polymers employed in the test compositions are the 50:50 lube oil terpolymer-succinimide concentrates produced in Runs 1, 2 and 3 described in Example II and said polymers will be designated in the subsequent table in terms of the run number in Example II. The "Control" was the aforedescribed base oil with no added materials therein.

The test data and results are reported below in Table III:

TABLE III

| Run | 1 | 2 | 3 | Control |
|---|---|---|---|---|
| Test Oil Composition: | | | | |
| Polymer Content, wt. percent | 1.8 | 2.4 | 1.0 | 0 |
| Light Duty Engine Test Hrs. to Reach 8.0 rating | | 114 | | <30 |
| Bench Sludge T. at (cycle.) | 4 | 6 | 1 | 0 |
| Shear Stability—Kin. Visc. 100° F. (cs.): | | | | |
| Before Shear | 65.2 | 82.6 | 49.0 | |
| After Shear | 62.5 | 70.1 | 46.9 | |
| Percent Change | −4 | −15 | −4.5 | |
| Kin. Visc. at 210° F. (cs.): | | | | |
| Before Shear | 9.48 | 11.73 | 7.46 | |
| After Shear | 9.20 | 10.31 | 7.14 | |
| Percent Change | −3 | −12 | −4.3 | |
| SUS Visc., 210° F.: | | | | |
| Before Shear | 57.5 | 65.5 | 50.65 | |
| After Shear | 56.6 | 60.4 | 49.6 | |
| Percent Change | −1.5 | −8 | −2 | |
| Viscosity Index: | | | | |
| Before Shear | 126 | 145 | 126 | 96 |
| After Shear | 127 | 141 | 122 | |

Example IV

This example illustrates the significance of the particular terpolymer moiety in the terpolymer-succinimide polymeric product present in the compositions of the invention.

To manufacture the terpolymer-succinimide derivative the procedure of Example II is essentially repeated except rather than employing a cracked polymer as a reactant uncracked terpolymer reactants are utilized. The uncracked polymer reactants are prepared by the polymerization of ethylene, propylene and diene monomers to the desired molecular weight and inherent viscosity.

The particular uncracked terpolymer precursor reactants employed in the procedure of Example II are as follows:

(a) Uncracked terpolymers XX and YY consisting of about 50 mole percent ethylene, 45 mole percent propylene, 5 mole percent methylene-norborene having an average M.W. of about 20,000 and an inherent viscosity of 2.53 in a 50:50 mineral oil (2400 SUS at 100° F.) mixture.

(b) Uncracked terpolymer ZZ consisting of 60 mole percent ethylene, 36 mole percent propylene and 4 mole percent norbornadiene having an average molecular weight of about 20,000 and an inherent viscosity of 2.16 in a 50:50 mineral oil (2400 SUS at 100° F.) mixture.

The procedure of Example II is essentially duplicated utilizing the aforedescribed terpolymer precursors as the polymeric and tetraethylenepentamine as the amine reactant. The formed uncracked terpolymer-succinimide adducts as their cracked counterparts described in Example II are composed of a terpolymer backbone of the same composition and molecular weight as the terpolymer precursor reactant having randomly distributed along the backbone N-tetraethylenepentamine succinimide groups.

The resultant uncracked terpolymer-succinimide adducts are incorporated in a paraffinic lubricating base oil of an SUS viscosity at 100° F. of about 128 of the type described in Example III. The products are subjected to shear stability tested as described in Example III.

Also tested was unreacted uncracked terpolymer WW in the aforedescribed base oil. Uncracked terpolymer WW is a terpolymer consisting of about 60 mole percent ethylene, 39 mole percent propylene, 1 mole percent 1,5-hexadiene having an inherent viscosity of 2.16 (1 wt. percent toluene at 100° F., a specific gravity of 0.85, a Mooney viscosity (ML+4; 250° F.) of 70, and an average molecular weight of about 60,000.

The test data and results are reported below in Table IV:

TABLE IV

| Description | XX | YY | ZZ | WW |
|---|---|---|---|---|
| Composition: | | | | |
| Terpolymer Reactant, approx. M.W. | 20,000 | 20,000 | 20,000 | 60,000 |
| Terpolymer-succinimide adduct product, M.W. terpolymer/succinimide group | 4,800 | 2,020 | 1,250 | |
| Wt. percent Polymer adduct in Oil Composition | 1.9 | 2.57 | 1.65 | 0.75 |
| Shear Stability Test—Kin. Visc., 100° F. (cs.): | | | | |
| Before Shear | 71.8 | 77.6 | 50.8 | 174.5 |
| After Shear | 56.8 | 65.2 | 40.5 | |
| Percent Change | −21 | −14 | −20 | |
| Kin. Visc., 210° F. (cs): | | | | |
| Before Shear | 10.88 | 10.80 | 7.96 | 19.25 |
| After Shear | 9.09 | 9.64 | 6.70 | 9.56 |
| Percent Change | −16.5 | −10.8 | −15.8 | −50.3 |
| SUS at 210° F. (cs.): | | | | |
| Before Shear | 62.0 | 61.76 | 51.95 | 94.6 |
| After Shear | 55.8 | 57.7 | 47.8 | 57.4 |
| Percent Change | −10 | −6.5 | −8 | −39.4 |

As can be seen by comparing the overall shear stability data of Table IV with that of Table III in Example III it is demonstrated terpolymer-succinimide derivatives prepared from a cracked terpolymer are superior in shear stability to analogous succinimide derivatives derived from uncracked terpolymers and also superior to uncracked terpolymer per se.

We claim:

1. A mineral lubricating oil composition containing between about 0.1 and 80 wt. percent of a cracked terpolymer-succinimide adduct prepared by first contacting a cracked hydrocarbon terpolymer with maleic anhydride at a temperature between about 80 and 250° C. and in a mole ratio of said hydrocarbon cracked terpolymer to said maleic anhydride of between about 1:10 and 1:35, subsequently contacting the resultant mixture with alkylene polyamine of the formula $H_2N(ANH)_bH$ where A is a divalent saturated aliphatic hydrocarbon radical of from 1 to 4 carbons and $b$ is a whole integer of from 1 to 6 at a temperature between about 25° C. and 150° C. and in a mole ratio of said maleic anhydride to said alkylene polyamine between about 2:1 and 1:2 to form said adduct, the terpolymer moiety and succinimide moiety of said adduct being present in said adduct in an amount of between about 500 and 20,000 molecular weight of terpolymer moiety per succinimide group, said hydrocarbon cracked terpolymer having a molecular weight between about 2,000 and 30,000 and an inhert viscosity between about 0.5 and 1.8 consisting of between about 10 and 90 mole percent ethylene, between about 90 and 10 mole percent propylene and between about 0.1 and 10 mole percent of an unconjugated diene selected from alkadiene and cycloalkadiene of from 5 to 10 carbons and said terpolymer reactant prepared by cracking a terpolymer precursor of the same component composition as said terpolymer and having a molecular weight of between about 40,000 and 2,000,000.

2. A lubricant composition in accordance with claim 1 wherein said first contacting is conducted in the presence of a mineral lubricating oil.

3. A composition in accordance with claim 2 wherein said terpolymer is composed of ethylene, propylene and dicyclopentadiene and said alkylene polyamine is tetraethylenepentamine.

4. A composition in accordance with claim 2 wherein said terpolymer is composed of ethylene, propylene and 1,5-hexadiene and said alkylene polyamine is tetraethylenepentamine.

References Cited

UNITED STATES PATENTS

| | | |
|---|---|---|
| 3,018,250 | 1/1962 | Anderson et al. |
| 3,216,936 | 11/1965 | Le Suer. |
| 3,219,666 | 11/1965 | Norman et al. |
| 3,235,503 | 2/1966 | De Vries. |

DANIEL E. WYMAN, Primary Examiner

W. J. SHINE, Assistant Examiner